United States Patent [19]

Heinrich et al.

[11] 4,006,129
[45] Feb. 1, 1977

[54] 2-NITRO-4-ALIPHATICOXY-PHENYL-AZO-2,6-DIHYDROXY-3-CYANO-4-METHYL-PYRIDINE COMPOUNDS

[75] Inventors: Ernst Heinrich; Horst Kindler, both of Frankfurt am Main-Fechenheim; Joachim Ribka, Offenbach am Main-Burgel, all of Germany

[73] Assignee: Cassella Farbwerke Mainkur Aktiengesellschaft, Germany

[22] Filed: Oct. 21, 1974

[21] Appl. No.: 516,360

[30] Foreign Application Priority Data

Oct. 22, 1973 Germany .......................... 2352858

[52] U.S. Cl. .................................. 260/156; 260/575
[51] Int. Cl.[2] .................................. C09B 29/36
[58] Field of Search .................................. 260/156

[56] References Cited
UNITED STATES PATENTS 3,487,066   12/1969   Ritter et al. .................. 260/156
3,869,441   3/1975    Hughes ........................ 260/156

Primary Examiner—Charles F. Warren
Attorney, Agent, or Firm—Connolly and Hutz

[57] ABSTRACT

Dyestuffs of the formula:

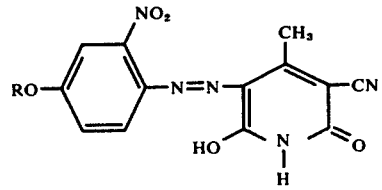

wherein R is
a. alkyl having 3 to 12 carbon atoms;
b. alkenyl having 2 to 4 carbon atoms;
c. alkyl having 2 to 12 carbon atoms substituted by $-O-(C_nH_{2n}O)_m-R_1$ wherein $R_1$ is alkyl having 1 to 4 carbon atoms or alkenyl having 2 to 4 carbon atoms, $n$ is 2, 3 or 4 and $m$ is 0, 1 or 2;
d. alkenyl having 2 to 4 carbon atoms substituted by said $-O-(C_nH_{2n}O)_m-R_1$ or
e. cycloalkyl having 5 or 6 carbon atoms or said cycloalkyl substituted by alkoxy having 1 to 4 carbon atoms;

process of making said dyestuffs and process of dyeing hydrophobic synthetic materials therewith and resulting dyed materials.

1 Claim, No Drawings

2-NITRO-4-ALIPHATICOXY-PHENYL-AZO-2,6-DIHYDROXY-3-CYANO-4-METHYLPYRIDINE COMPOUNDS

The present invention relates to water-insoluble monoazo dyestuffs of the formula:

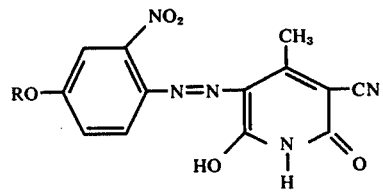

wherein R is
a. alkyl having 3 to 12 carbon atoms;
b. alkenyl having 2 to 4 carbon atoms;
c. alkyl having 2 to 12 carbon atoms substituted by -O-$(C_nH_{2n}O)_m$-$R_1$ wherein $R_1$ is alkyl having 1 to 4 carbon atoms or alkenyl having 2 to 4 carbon atoms, n is 2, 3 or 4 and m is 0, 1 or 2;
d. alkenyl having 2 to 4 carbon atoms substituted by said -O-$(C_nH_{2n}O)_m$-$R_1$ or
e. cycloalkyl having 5 or 6 carbon atoms or said cycloalkyl substituted by alkoxy having 1 to 4 carbon atoms.

The dyestuffs of this invention may be prepared by a process which comprises diazotising an amine of the formula:

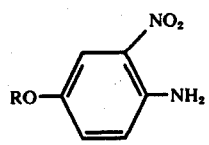

wherein R is as aforesaid, and coupling the diazotisation product with 3-cyano-4-methyl-6-hydroxy-2-pyridone, i.e., the compound of the formula:

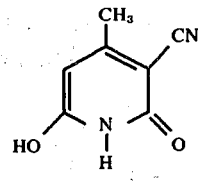

When forming disperse dyestuffs, it can be of advantage to diazotise a mixture of two or more different amines of formula II and to couple the diazotisation product with 3-cyano-4-methyl-6-hydroxy-2-pyridone.

It is possible for the dyestuffs of formula I and the compounds of formula III to exist in certain tautomeric forms and it is to be understood, that the present invention includes dyestuffs I and compounds III in all their respective possible tautomeric forms.

Compound III can be produced, as described by Bobbitt and Scola in J. Org. Chem. 25, 560, by the condensation of acetoacetic acid ethyl ester with cyanoacetamide in the presence of potassium hydroxide in boiling methanol.

The amines of formula II, which are employed as starting materials, can be produced, for example, by reacting p-nitrochlorobenzene of formula IV with an alcoholate of formula V to give a nitro product of formula VI and reducing this to an amine of formula VII. This is followed by acetylation of the amine to an acetylamine of formula VIII, which, after nitration to a compound of formula IX and saponification, gives the amine of formula II required as the starting product:

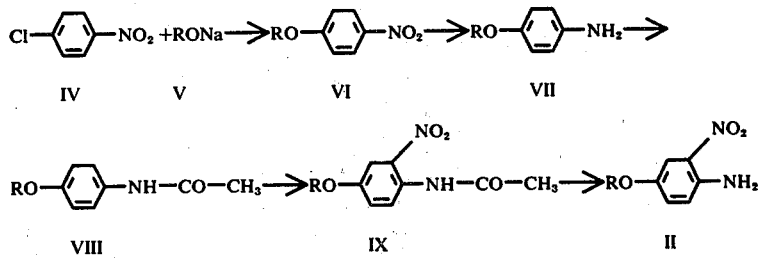

Examples of possible radicals R in formula V and hence also in formula II are:

—$CH_2$—$CH_2$—$OCH_3$

—$CH_2$—$CH_2$—O—$C_4H_{9(n)}$

—($CH_2$—$CH_2$—O)$_2$—$CH_3$

—($CH_2$—$CH_2$—O)$_2$—$C_2H_5$

—($CH_2$—$CH_2$—O)$_3$—$CH_3$

—($CH_2$—$CH_2$—O)$_3$—$C_3H_{7(iso)}$

—$CH_2$—$CH_2$—$CH_3$

—CH$\begin{smallmatrix}/CH_3\\ \backslash CH_3\end{smallmatrix}$

-continued

—CH$_2$—CH$_2$—CH$_2$—OCH$_3$

—CH$_2$—CH—CH$_3$
           |
           O—CH$_2$—CH$_3$

—CH$_2$—CH=CH$_2$

CH$_3$
           |
—CH$_2$—C=CH$_2$

—CH$_2$—CH$_2$—CH$_2$—CH$_3$

CH$_3$
       |
—CH
       |
       CH$_2$—CH$_3$

CH$_3$
                |
—CH$_2$—CH
                |
                CH$_3$

CH$_3$
       |
—C—CH$_3$
       |
       CH$_3$

—CH$_2$—CH$_2$—CH—CH$_3$
                     |
                     OCH$_3$

—CH$_2$—CH$_2$—CH$_2$—CH$_2$—O—CH$_2$—CH$_3$

—CH$_2$—CH=CH—CH$_3$

—(CH$_2$)$_4$—CH$_3$

CH$_3$
                      |
—CH$_2$—CH$_2$—CH
                      |
                      CH$_3$

—(CH$_2$)$_5$—CH$_3$

CH$_2$—CH$_3$
       |
—CH
       |
       CH$_2$—CH$_2$—CH$_3$

—(CH$_2$)$_6$—CH$_3$

CH$_3$
       |
—CH                      CH$_3$
       |                 |
       CH$_2$—CH$_2$—CH
                         |
                         CH$_3$

—(CH$_2$)$_7$—CH$_3$

CH$_2$—CH$_2$—CH$_3$
                  |
—CH$_2$—CH$_2$—CH                    —(CH$_2$—CH$_2$—CH$_2$—O)$_2$—CH$_3$
                  |
                  CH$_2$—CH$_3$       —(CH$_2$—CH$_2$—CH$_2$—O)$_2$—C$_2$H$_5$

CH$_3$
       |
—CH                                    —(CH$_2$—CH$_2$—CH$_2$—O)$_3$—C$_2$H$_5$
       |
       (CH$_2$)$_6$—CH$_3$

—(CH$_2$)$_9$—CH$_3$                   —CH$_2$—CH=CH—OCH$_3$

—(CH$_2$)$_{11}$—CH$_3$                —CH$_2$—CH=CH—O—CH$_2$—CH$_2$—OCH$_3$

                          OC$_2$H$_5$
                                               |
                                       —CH$_2$—C=CH$_2$ -continued

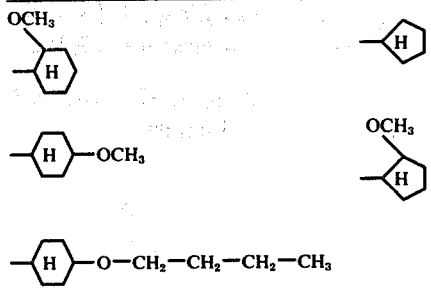

—⟨H⟩—O—CH₂—CH₂—CH₂—CH₃

The dyestuffs according to the invention are particularly suitable for dyeing and printing shaped articles comprising numerous synthetic materials, for example, polyolefins, polyvinyl compounds, cellulose 2½-acetate, cellulose triacetate, and, especially polyester materials, e.g. polyethylene glycol terephthalate. On these materials, they give, by the ordinary dyeing and printing processes, deep orange dyeings and prints with very good fastness properties, especially with very good fastness to light and to sublimation, and very good build-up capacity.

The dyeing of the said materials (more particularly in fibre form) with the dyestuffs according to the invention is suitably carried out from aqueous suspension in the presence of carriers at approximately 80° – 100° C, or in the absence of carriers at approximately 110° – 140° C, or by the "thermofixing" process at approximately 180°–230° C. The printing of the said materials can be carried out by steaming the goods printed with the dyestuffs according to the invention in the presence of a carrier at approximately 80° – 110° C, or in the absence of a carrier at approximately 110° – 140° C, or by treating the goods by the "thermofixing" process at approximately 180° – 230° C.

The dyestuffs according to the invention are also suitable for dyeing the above-mentioned (hydrophobic) materials from organic solvents, and for bulk-dyeing.

Compared to the dyestuffs described in German Published Specification (Offenlegungsschrift) No. 1,544,446, Example 4, which are obtained by coupling diazotised 3-nitro-4-amino-anisole or 3-nitro-4-amino-phenetole with 3-cyano-4-methyl-6-hydroxy-2-pyridone, the dyestuffs according to this invention possess greater tinctorial strength and/or better build-up capacity.

The following Examples illustrate the invention.

EXAMPLE 1 a) Twenty-one parts by weight of 3-nitro-4-aminophenyl n-butyl ether of the formula

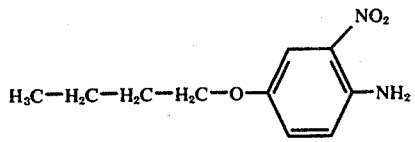

are diazotised in 150 parts by weight of glacial acetic acid by means of 34.2 parts by weight of 41.3% strength nitrosylsulphuric acid at +15° C, with external cooling. The clear diazo solution is then allowed to run into a suspension of 16.5 parts by weight of 3-cyano-4-methyl-6-hydroxy-2-pyridone in 400 parts by weight of water and 120 parts by weight of sodium hydroxide solution of 33° Be strength. During the coupling, the reaction temperature is kept at 0° to +5° C by addition of approximately 500 parts by weight of ice. After completion of coupling, the resulting dyestuff is filtered off, rinsed with water and dried. It is a red powder which gives a red solution in concentrated sulphuric acid.

b. One part by weight of the finely disperse dyestuff of the formula

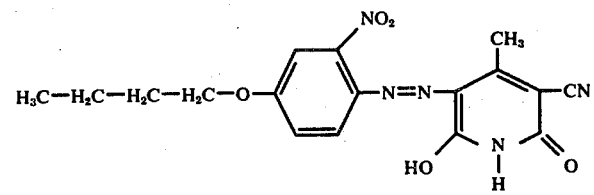

thus obtained is stirred into 2,000 parts by weight of water. The pH value is adjusted to 5-6 with acetic acid and 4.0 parts by weight of ammonium sulphate and 2.0 parts by weight of a commercially available dispersing agent based on a naphthalenesulphonic acid/formaldehyde condensate are added.

One hundred parts by weight of a polyester fabric based on polyethylene glycol terephthalate are introduced into the dyeing liquor thus obtained and the fabric is dyed for 1½ hours at 130° C.

After subsequent rinsing, reductive after-treatment with an 0.2% strength alkaline sodium dithionite solution for 15 minutes at 70° – 80° C, rinsing and drying, a deep orange dyeing with very good tinctorial properties, especially very good fastness to light and to thermofixing, and very good build-up capacity, is obtained.

c. Thirty parts by weight of the dyestuff obtained according to Example 1a, in a finely divided form, are incorporated into a printing paste which contains 45.0 parts by weight of carob bean flour, 6.0 parts by weight of sodium 3-nitrobenzene-sulphonate and 3.0 parts by weight of citric acid per 1,000 parts by weight. Using this printing paste, an orange print of very good fastness properties is obtained on a triacetate fabric after printing, drying and fixing by pressure steaming for 15 minutes at 1.5 atmospheres gauge, rinsing and finishing, as described in paragraph 3 of Example 1b.

EXAMPLE 2 a. Following the procedure described in Example 1a, 25.6 parts by weight of 3-nitro-4-amino-phenyl [β-β'-methoxy)ethoxy]-ethyl ether of the formula

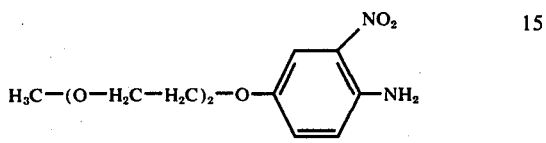

are diazotised and coupled with 16.5 parts by weight of 3-cyano4-methyl-6-hydroxy-2-pyridone, and the product is isolated. The resulting dyestuff is a red powder which gives a red solution in concentrated sulphuric acid.

b. A polyethylene glycol terephthalate fabric is padded on a padder at 30° C with a liquor which contains 30 parts by weight of the dyestuff of the formula

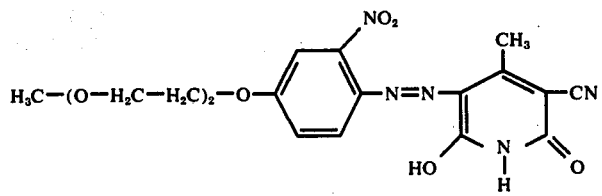

which had been brought to a finely divided state, 1.0 part by weight of polyacrylamide of K-value 120 and 0.5 part by weight of a polyglycol ether of oleyl alcohol and 968.5 parts by weight of water. After drying, fixing is carried out in a thermofixing frame for 60 seconds at 210° C. After subsequent rinsing and finishing as described in Example 1b, paragraph 3, an orange dyeing of very good fastness properties and very good build-up capacity is obtained.

EXAMPLE 3 a. Following the procedure described in Example 1a, 21.0 parts by weight of 3-nitro-4-amino-phenyl α-methyl-propyl ether of the formula

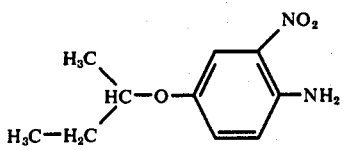

are diazotised and coupled with 16.5 parts by weight of 3-cyano-4-methyl-6-hydroxy-2-pyridone, and the product is isolated. The resulting dyestuff is a red powder which gives a red solution in concentrated sulphuric acid.

b. Thirty parts by weight of the dyestuff obtained according to Example 3a, of the formula

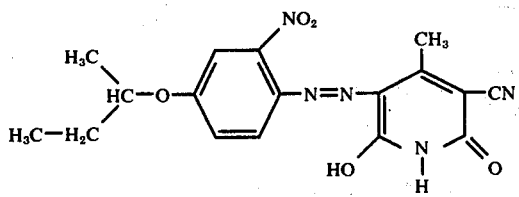

are incorporated, in a finely divided form, into a printing paste which contains 45.0 parts by weight of carob bean flour, 6.0 parts by weight of sodium 3-nitrobenzene-sulphonate and 3.0 parts by weight of citric acid per 1,000 parts by weight. Using this printing paste, a deep orange print of very good tinctorial properties, especially very good fastness to light and to thermofixing, and of very good build-up capacity, is obtained on a polyester fabric after printing, drying and fixing in a thermofixing frame for 45 seconds at 215° C, rinsing and finishing, as described in paragraph 3 of Example 1b.

EXAMPLE 4 a. Following the procedure in Example 1a, 26.6 parts by weight of 3-nitro-4-amino-phenyl 2'-ethyl-n-hexyl ether of the formula

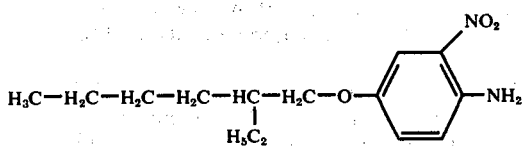

are diazotised and coupled with 16.5 parts by weight of 3-cyano-4-methyl-6-hydroxy-2-pyridone, and the product is isolated. The resulting dyestuff is a red powder which gives a red solution in concentrated sulphuric acid.

b. Following the procedure described in Example 1b, a polyethylene glycol terephthalate fabric is dyed with 1.0 part by weight of the finely disperse dyestuff of the formula 1

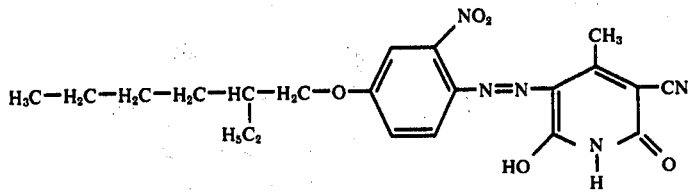

obtained above, and is after-treated. A deep orange dyeing having very good tinctorial properties, especially very good fastness to light and to thermofixing and very good build-up capacity, is obtained. The dyestuff has very good pH-stability.

EXAMPLE 5

One hundred parts by weight of polyester material are treated for 30 minutes at 121° C in 1,500 parts by weight of tetrachloroethylene in which 2.0 parts by weight of the dyestuff described in Example 1a are dissolved.

The material is rinsed with warm and cold tetrachloroethylene and a strong orange dyeing of very good tinctorial properties is obtained.

Orange dyeings of very good tinctorial properties are also obtained if, in the above example, the polyester material is replaced by 100 parts by weight of triacetate of 2½-acetate material and this material is dyed for 45 minutes at 110° C or 45 minutes at 80° C, respectively.

The table which follows indicates further dyestuffs according to the invention, manufactured by coupling in accordance with the procedures of Examples 1 – 4, which give deep orange dyeings or prints, also having very good tinctorial properties, on polyester materials:

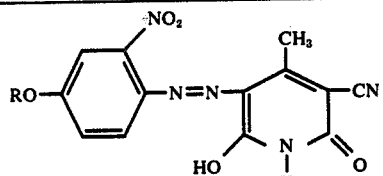

| No. | R |
|---|---|
| 1 | $-CH_2-CH_2-CH_3$ |
| 2 | $-C(CH_3)_2$ (isopropyl shown as -C with two CH₃) |
| 3 | $-CH_2-CH(CH_3)_2$ |
| 4 | $-C(CH_3)_3$ |
| 5 | $-(CH_2)_4-CH_3$ |
| 6 | $-CH_2-CH_2-CH(CH_3)_2$ |
| 7 | $-(CH_2)_5-CH_3$ |

-continued

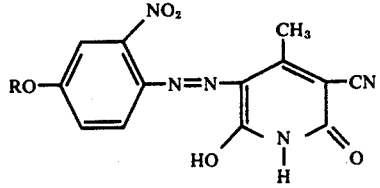

| No. | R |
|---|---|
| 8 | $-CH(CH_2-CH_3)(CH_2-CH_2-CH_3)$ |
| 9 | $-(CH_2)_6-CH_3$ |
| 10 | $-(CH_2)_7-CH_3$ |
| 11 | $-CH_2-CH_2-CH(CH_2-CH_2-CH_3)(CH_2-CH_3)$ |
| 12 | $-(CH_2)_9-CH_3$ |
| 13 | $-(CH_2)_{11}-CH_3$ |
| 14 | $-CH=CH_2$ |
| 15 | $-CH_2-CH=CH_2$ |
| 16 | $-CH_2-C(CH_3)=CH_2$ |
| 17 | $-CH_2-CH=CH-CH_3$ |
| 18 | $-CH_2-CH_2-OCH_3$ |
| 19 | $-CH_2-CH_2-CH_2-OCH_3$ |
| 20 | $-CH_2-CH_2-CH(OCH_3)-CH_3$ |
| 21 | $-CH_2-CH(O-C_2H_5)-CH_3$ |
| 22 | $-CH_2-CH_2-O-C_3H_{7(iso)}$ |
| 23 | $-CH_2-CH_2-CH_2-O-C_4H_{9(n)}$ |
| 24 | $-CH_2-CH_2-CH(O-C_4H_{9(n)})-CH_3$ |
| 25 | $-CH_2-CH_2-CH_2-CH_2-O-C_2H_5$ |
| 26 | $-CH_2-CH_2-CH_2-CH_2-O-C_4H_{9(n)}$ |
| 27 | $-CH_2-CH_2-O-CH_2-CH=CH_2$ |
| 28 | $-(CH_2-CH_2-O)_2-CH_3$ |
| 29 | $-(CH_2-CH_2-O)_2-C_4H_{9(n)}$ |
| 30 | $-(CH_2-CH_2-O)_3-CH_3$ |
| 31 | $-(CH_2-CH_2-O)_3-C_2H_5$ |

-continued
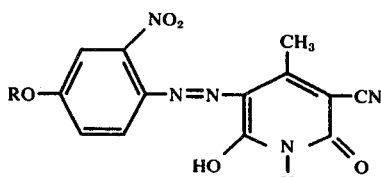
| No. | R |
|---|---|
| 32 | —(CH₂—CH₂—CH₂—CH₂—O)₂—CH₃ |
| 33 | —(CH₂—CH₂—O)₂—CH₂—CH═CH—CH₃ |
| 34 | —(CH₂—CH₂—CH₂—O)₂—CH₃ |
| 35 | —(CH₂—CH₂—CH₂—O)₂—C₂H₅ |
| 36 | —(CH₂—CH₂—CH₂—O)₂—C₂H₅ |
| 37 | —CH₂—CH═CH—OCH₃ |
| 38 | —CH₂—CH═CH—O—CH₂—CH₂—OCH₃ |
| 39 | —CH₂—C(OC₂H₅)═CH₂ |
| 40 |  |
-continued
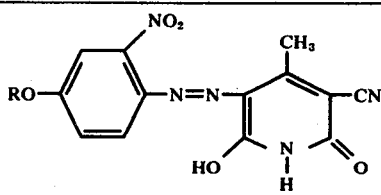
| No. | R |
|---|---|
| 41 |  OCH₃ |
| 42 |  |
| 43 |  —OCH₃ |
| 44 | cyclohexyl—O—(CH₂)₃—CH₃ |
What we claim is:
1. The water-insoluble monoazo dye of the formula
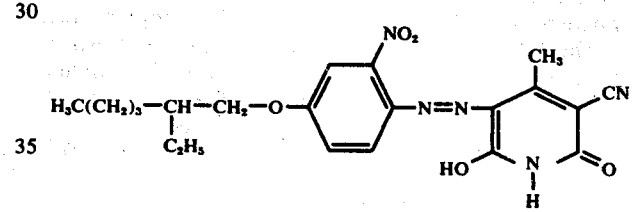
* * * * *